US011907771B2

(12) United States Patent
Yoon et al.

(10) Patent No.: US 11,907,771 B2
(45) Date of Patent: Feb. 20, 2024

(54) ACTION RECOGNITION DEVICE AND ACTION RECOGNITION METHOD

(71) Applicants: HYUNDAI MOTOR COMPANY, Seoul (KR); KIA CORPORATION, Seoul (KR)

(72) Inventors: Young Chul Yoon, Seoul (KR); Hyeon Seok Jung, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 90 days.

(21) Appl. No.: 17/702,108

(22) Filed: Mar. 23, 2022

(65) Prior Publication Data

US 2023/0079308 A1  Mar. 16, 2023

(30) Foreign Application Priority Data

Sep. 16, 2021  (KR) .......................... 10-2021-0124153

(51) Int. Cl.
*G06F 9/52* (2006.01)
*G06F 9/54* (2006.01)
*G06F 18/214* (2023.01)

(52) U.S. Cl.
CPC ................ *G06F 9/52* (2013.01); *G06F 9/546* (2013.01); *G06F 18/2155* (2023.01)

(58) Field of Classification Search
CPC ......... G06F 9/52; G06F 18/2155; G06F 9/546
(Continued)

(56) References Cited

U.S. PATENT DOCUMENTS 5,864,342 A * 1/1999 Kajiya .................. G06T 11/001
  345/589
6,779,060 B1 * 8/2004 Azvine .................. G06F 9/451
  710/37
(Continued)

FOREIGN PATENT DOCUMENTS

JP  4786516 B2  10/2011
KR  10-1482970 B1  1/2015
(Continued)

OTHER PUBLICATIONS

Tsai, Jen-Kai, et al., "Deep Learning-Based Real-Time Multiple-Person Action Recognition System," Sensors, 20, 4758 (2020).
(Continued)

*Primary Examiner* — Paul R. Myers
(74) *Attorney, Agent, or Firm* — MCDONNELL BOEHNEN HULBERT & BERGHOFF LLP

(57) ABSTRACT

Disclosed are an action recognition device and an action recognition method for recognizing actions of multiple objects in real time. The action recognition device includes a camera for capturing an image, a target queue storing therein data about at least one target, a reasoner configured to perform action reasoning, and a computing device electrically connected to the camera, the target queue and the reasoner, wherein the computing device may update the target queue based on an object tracking result on the image, extract a target from the target queue, request the reasoner to perform action reasoning on the extracted target, and output an action recognition result based on an action reasoning result provided from the reasoner.

17 Claims, 11 Drawing Sheets

(58) Field of Classification Search
USPC .......................................................... 710/200
See application file for complete search history.

(56) References Cited

U.S. PATENT DOCUMENTS

| | | | |
|---|---|---|---|
| 9,218,545 B2 | 12/2015 | Fahn et al. | |
| 10,691,949 B2 | 6/2020 | Danielsson et al. | |
| 10,957,059 B1* | 3/2021 | Katz | G06T 7/521 |
| 11,282,404 B1* | 3/2022 | Yang | G06F 3/013 |
| 2002/0078072 A1* | 6/2002 | Tan | H04L 9/40 |
| 2005/0117778 A1* | 6/2005 | Crabtree | G06T 7/20 |
| | | | 382/103 |
| 2009/0278937 A1* | 11/2009 | Botchen | G06V 20/52 |
| | | | 348/169 |
| 2014/0267738 A1* | 9/2014 | Allen | H04N 7/188 |
| | | | 382/103 |
| 2015/0067526 A1* | 3/2015 | Kim | G06T 11/60 |
| | | | 715/739 |
| 2015/0356840 A1* | 12/2015 | Wang | G08B 13/19608 |
| | | | 382/103 |
| 2016/0219078 A1* | 7/2016 | Porras | H04L 41/22 |
| 2017/0169541 A1* | 6/2017 | Funami | G06T 11/60 |
| 2018/0137362 A1 | 5/2018 | Danielsson et al. | |
| 2018/0137365 A1* | 5/2018 | Schulter | G08B 21/02 |
| 2020/0279103 A1* | 9/2020 | Sasaki | H04N 7/18 |
| 2021/0105442 A1* | 4/2021 | Shoa Hassani Lashdan | ............... |
| | | | G06V 20/46 |
| 2022/0215258 A1* | 7/2022 | Busch | H04L 67/125 |

FOREIGN PATENT DOCUMENTS

| | | |
|---|---|---|
| KR | 10-1543150 B1 | 8/2015 |
| KR | 10-1563297 B1 | 10/2015 |
| KR | 2018-0054453 A | 5/2018 |
| KR | 10-2213494 B1 | 2/2021 |
| KR | 2021-0040604 A | 4/2021 |
| KR | 2021-0059411 A | 5/2021 |

OTHER PUBLICATIONS

Lee, Junwoo, et al., "Real-Time Human Action Recognition with a Low-Cost RGB Camera and Mobile Robot Platform," Sensors, 20, 2886 (2020).

Yoon, Young-Chul, et al., "Real-Time Multi-Person Action Recognition with a Neural Compute Stick," 2021 21st International Conference on Control, Automation and Systems (ICCAS), 2021, pp. 1135-1140.

* cited by examiner

ACTION RECOGNITION DEVICE AND ACTION RECOGNITION METHOD

CROSS REFERENCE TO RELATED APPLICATIONS

This application claims the benefit of priority to Korean Patent Application No. 10-2021-0124153, filed in the Korean Intellectual Property Office on Sep. 16, 2021, the entire contents of which are incorporated herein by reference.

TECHNICAL FIELD

The present disclosure relates to an action recognition device and an action recognition method for recognizing actions of multiple objects in real time.

BACKGROUND

An action recognition technique is configured for recognizing a human action, and is usefully used in health care and human-computer interaction fields. The action recognition technique performs action analysis of specific targets in an image or action analysis on an entire image.

In a conventional action recognition technique, as the number of action analysis targets (e.g., persons) increases, a proportion of GPU (Graphic Processing Unit) for action recognition in a limited area of an embedded device increases, thereby affecting an entire system.

SUMMARY

The present disclosure has been made to solve the above-mentioned problems occurring in the prior art while advantages achieved by the prior art are maintained intact.

An aspect of the present disclosure provides an action recognition device and an action recognition method for performing asynchronous action recognition of multiple objects using a separate edge device.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an action recognition device includes a camera for capturing an image, a target queue storing therein data about at least one target, a reasoner configured to perform action reasoning, and a computing device electrically connected to the camera, the target queue and the reasoner, wherein the computing device may update the target queue based on an object tracking result on the image, extract a target from the target queue, request the reasoner to perform action reasoning on the extracted target, and output an action recognition result based on an action reasoning result provided from the reasoner.

The reasoner may be embodied as an edge device including a processor and a memory.

The computing device may arrange objects included in the object tracking result based on depth information of the objects, search the target queue for a target having the same identification information as identification information of each of the objects in the arrangement order, and update data about the searched target using data about each of the objects.

When the target with the same identification information as the identification information of each of the objects is not found in the target queue, the computing device may determine whether an empty space is present in the target queue. When the empty space is present in the target queue, the computing device may add the data about each of the objects to the target queue.

When the extracted target satisfies a reasoning condition, the computing device may request the reasoner to perform action reasoning of the extracted target, push the extracted target to the target queue, and determine whether a reasoning completion result is present in the reasoner. When the reasoning completion result is absent in the reasoner, the computing device may perform target management without waiting for receiving the reasoning completion result. Alternatively, when the reasoning completion result is present in the reasoner, the computing device may receive the action reasoning result from the reasoner.

The reasoning condition may include a condition that a time difference between a current time and the most recently updated time of the extracted target is smaller than a predefined update time, the extracted target has not been used in reasoning, the number of templates of the extracted target is a predefined number, and the separate queue in the reasoner is not in a full state.

When identification information of the extracted target matches identification information related to the reasoning result, the computing device may update an action result of a target corresponding to the identification information related to the reasoning result with the reasoning result, and determine whether an action class of the target corresponding to the identification information related to the reasoning result satisfies an activation condition, based on the action result. When the action class satisfies the activation condition, the computing device may output the action class as an action recognition result.

The activation condition may include a condition that an average probability distribution for the action class is the highest average probability distribution for the action class, and the highest average probability distribution for the action class exceeds a predefined class activation threshold value or a difference between the highest average probability distribution for the action class and a next highest average probability distribution for the action class exceeds a predefined threshold value.

The computing device may determine whether the extracted target satisfies a delete condition. When the extracted target satisfies the delete condition, the computing device may delete the extracted target without pushing the extracted target to the target queue.

The delete condition may include a condition that a time difference between the latest update time of the extracted target and a current time exceeds a predetermined threshold time.

According to an aspect of the present disclosure, an action recognition method includes receiving, by a computing device, an image from a camera, updating, by the computing device, a target queue storing therein data about at least one target, based on an object tracking result on the image, reasoning, by the computing device, an action of a target extracted from the target queue using a reasoner, and outputting, by the computing device, an action recognition result based on an action reasoning result obtained using the reasoner.

The updating of the target queue may include arranging, by the computing device, objects included in the object tracking result based on depth information of the objects, searching, by the computing device, the target queue for a target having the same identification information as identification information of each of the objects in the arrangement order, and updating, by the computing device, data about the searched target using data about each of the objects.

The updating of the target queue may include, when the target having the same identification information as the identification information of each of the objects is not found in the target queue, determining, by the computing device, whether an empty space is present in the target queue, and when the empty space is present in the target queue, adding, by the computing device, the data about each of the objects to the target queue.

The reasoning of the action of the extracted target may include, when the extracted target satisfies a reasoning condition, requesting, by the computing device, the reasoner to perform action reasoning of the extracted target, pushing, by the computing device, the extracted target to the target queue, determining, by the computing device, whether a reasoning completion result is present in the reasoner, and when the reasoning completion result is absent in the reasoner, performing, by the computing device, target management without waiting for receiving the result, and when the reasoning completion result is present in the reasoner, receiving, by the computing device, the action reasoning result from the reasoner.

The reasoning condition may include a condition that a time difference between a current time and the most recently updated time of the extracted target is smaller than a predefined update time, the extracted target has not been used in reasoning, the number of templates of the extracted target is a predefined number, and the separate queue in the reasoner is not in a full state.

The outputting of the action recognition result may include, when identification information of the extracted target matches identification information related to the reasoning result, updating, by the computing device, an action result of a target corresponding to the identification information related to the reasoning result with the reasoning result, determining, by the computing device, whether an action class of the target corresponding to identification information related to the reasoning result satisfies an activation condition, based on the action result, and when the action class satisfies the activation condition, outputting, by the computing device, the action class as an action recognition result.

The activation condition may include a condition that an average probability distribution for the action class is the highest average probability distribution for the action class, and the highest average probability distribution for the action class exceeds a predefined class activation threshold value or a difference between the highest average probability distribution for the action class and a next highest average probability distribution for the action class exceeds a predefined threshold value.

The method may further include determining, by the computing device, whether the extracted target satisfies a delete condition, and when the extracted target satisfies the delete condition, deleting, by the computing device, the extracted target without pushing the extracted target to the target queue.

The delete condition may include a condition that a time difference between the latest update time of the extracted target and a current time exceeds a predetermined threshold time.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
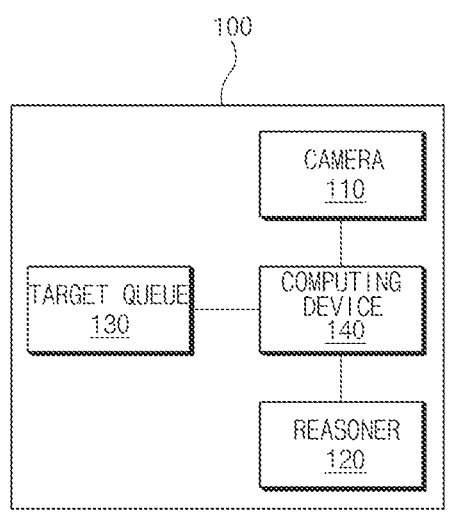
FIG. 1 shows a block diagram of an action recognition device according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing an embodiment of the present disclosure, a detailed description of the related known configuration or function will be omitted when it is determined that it interferes with the understanding of an embodiment of the present disclosure.

In describing the components of an embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows a block diagram of an action recognition device according to embodiments of the present disclosure.

An action recognition device 100 may be mounted on an electronic device (e.g., a smart phone or a robot, etc.) that provides a predetermined specific service based on an embedded platform. The action recognition device 100 may recognize actions of multiple objects in real time and transmit information about the recognized actions to a controller (not shown) of the electronic device. The controller of the electronic device may provide an appropriate service based on the action information provided from the action recognition device 100. The controller may be implemented as a processing device such as ARM (Advanced RISC (Reduced Instruction Set Computer) Machine), MIPS (Microprocessor without Interlocked Pipeline Stages), a microcontroller, a digital signal processor (DSP), or 8051.

As shown in FIG. 1, the action recognition device 100 may include a camera 110, a reasoner (or inference device) 120, a target queue 130, and a computing device 140, and the like.

The camera 110 may be installed in the action recognition device 100 to capture an image around the camera. The camera 110 may transmit the captured image (e.g., a 2D image and/or a 3D image) to the computing device 140. The camera 110 may include a 2D camera and/or a 3D camera (stereo camera).

The reasoner 120 may transmit and receive information (data) to and from the computing device 140. The reasoner 120 may perform action recognition reasoning in response to a request from the computing device 140. When the computing device 140 inquires about reasoning completion, the reasoner 120 may transmit 'true' as result information to the computing device 140 when the reasoner 120 has completed reasoning. When the reasoning is not completed, the reasoner 120 may transmit 'false' as result information to the computing device 140. The reasoner 120 may be implemented as an edge device such as a neural compute stick (NCS) or a google coral. Further, the reasoner 120 may be implemented as a computing device having a separate internal memory and a separate internal processor.

The target queue 130 may be a memory (e.g., a buffer) that stores information about an action recognition target object (hereinafter, a target), that is, target information. A predetermined number of target information may be stored in the target queue 130.

The computing device 140 may detect and track an object in an image input from the camera 110. The computing device 140 may receive the image transmitted from the camera 110. The computing device 140 may detect at least one object in the received image. The computing device 140 may select at least one target from the detected at least one object. The computing device 140 may track a movement of the selected at least one target.

The computing device 140 may manage data (target information) on a limited number of targets using the target queue 130. The computing device 140 may perform action recognition of an object (target) based on an object tracking result. The computing device 140 may extract target information (target data) from the target queue 130 and generate an action reasoning request message using the extracted target information. The computing device 140 may transmit the generated action reasoning request message to the reasoner 120. Further, the computing device 140 may generate an inquiry message to inquire whether there is a request of action reasoning for which the action reasoning has been completed and transmit the inquiry message to the reasoner 120. The computing device 140 may determine whether to receive a reasoning result based on a response message to the inquiry message from the reasoner 120. When the request of action reasoning for which the action reasoning has been completed is present, the computing device 140 may request the reasoner 120 to send the reasoning result and thus may receive the reasoning result. When the request of action reasoning for which the action reasoning has been completed is absent, the computing device 140 may proceed to a next step (target management step) without waiting for the reasoning result.

The computing device 140 may transmit action recognition information to the controller (not shown) of the electronic device. The controller of the electronic device may provide a predetermined specific service based on the action recognition information. Although not shown in the drawing, the computing device 140 may include at least one processor, and may include a memory located therein and/or out thereof. At least one processor may be implemented as at least one of processing devices such as ASIC (Application Specific Integrated Circuit), DSP (Digital Signal Processor), PLD (Programmable Logic Devices), FPGAs (Field Programmable Gate Arrays), CPU (Central Processing Unit), microcontrollers or microprocessors (microprocessors) or the like. The memory may include at least one of non-transitory storage media such as flash memory, hard disk, solid state disk (SSD), random access memory (RAM), static random access memory (SRAM), read only memory (ROM), programmable read only memory (PROM), electrically erasable and programmable ROM (EEPROM), or erasable and programmable ROM (EPROM). The memory may store therein an object detection and tracking algorithm and/or an action recognition target object management algorithm, and the like.

Although the above embodiment describes that the device performs the action recognition, the performing of action recognition may be modified into an algorithm that requires reasoning on an object basis (e.g., a gesture recognition algorithm, an object classification algorithm, and/or all algorithms that require individual reasoning of multiple objects, etc.) Therefore, an input to the action recognition device and a network structure (3D CNN, 2D CNN, and/or LSTM (Long Short-Term Memory) of a reasoning engine may have various modifications.

Figure 2:
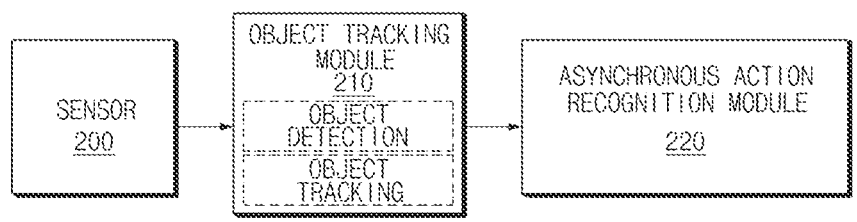
FIG. 2 shows an overall framework for action recognition according to embodiments of the present disclosure.
Figure 3:
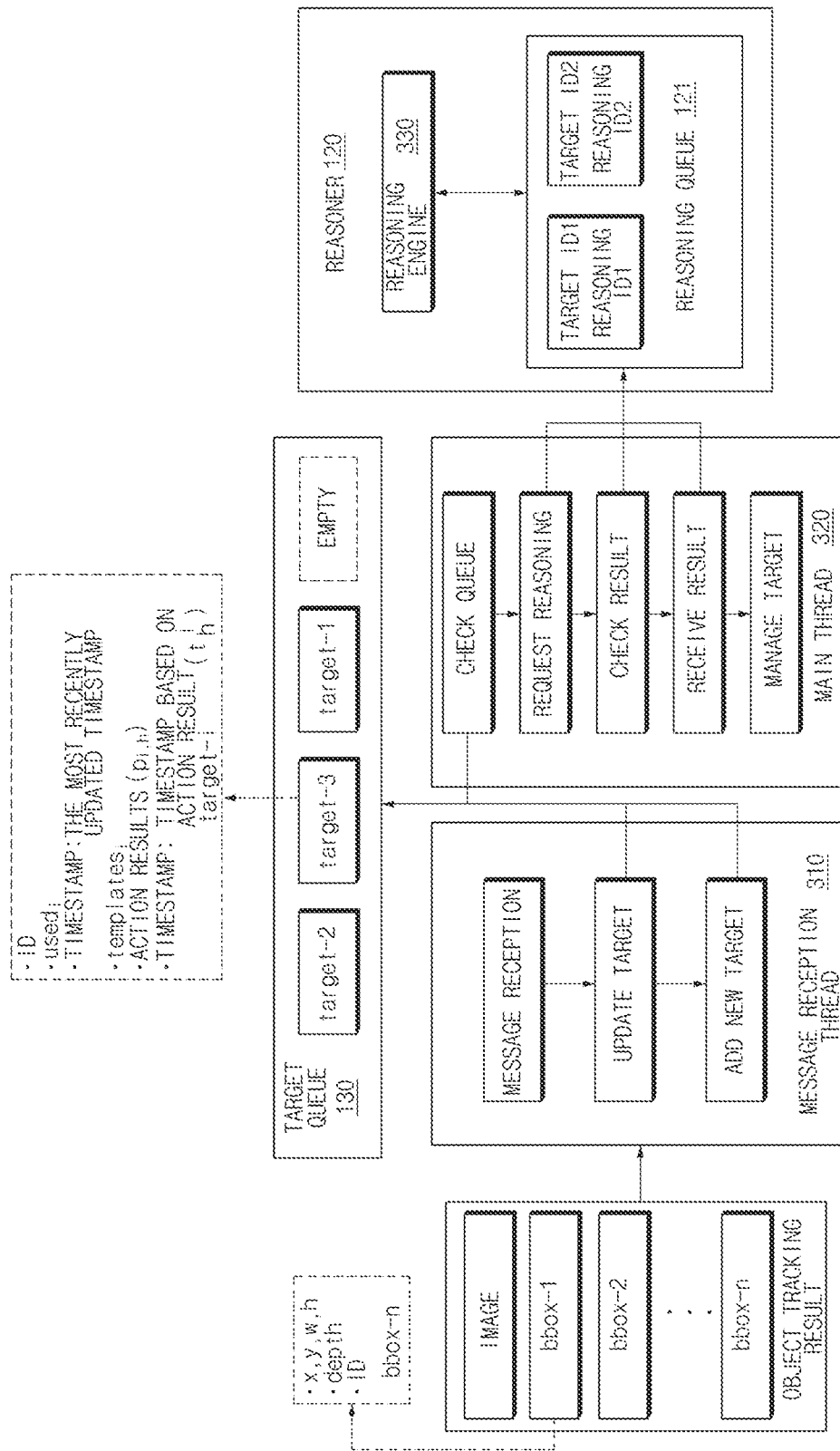
FIG. 3 shows a framework of an asynchronous action recognition module shown in FIG. 2.

FIG. 2 shows an overall framework for action recognition according to embodiments of the present disclosure, and FIG. 3 shows a framework of an asynchronous action recognition module shown in FIG. 2.

A sensor 200 may acquire sensed data, that is, an image, and transmit the sensed data to an object tracking module 210. The sensor 200 may include the camera 110 shown in FIG. 1. The sensor 200 may further include an IMU (Inertial Measurement Unit) and/or a depth sensor to improve object tracking performance.

The object tracking module 210 may detect at least one object included in the image input from the sensor 200 and track movement of the at least one object as detected. The object tracking module 210 may perform object detection and tracking using an object detection scheme, an object tracking technique, and/or a multiple-objects tracking technique as well-known in the art.

The object tracking module 210 may generate and output a message including an object tracking result. The object tracking result may include the image and object information. The object information may include information about each of objects detected in the image. Each object information (i.e. object data) may include identification information (object ID (identification)) of a bounding box (bbox) of an object, depth information of the object, center coordinate information (x, y) of the object, and size information (e.g. width (w) and height (h)) of the object.

An asynchronous action recognition module 220 may perform action recognition based on the object tracking result output from the object tracking module 210. The asynchronous action recognition module 220 may perform the action recognition using a message reception thread (a message subscriber) 310, a main thread 320 and a reasoning engine 330 of the reasoner 120 which operate independently. The asynchronous action recognition module 220 may use a mutex or a lock to restrict the message reception thread 310 and the main thread 320 from simultaneously accessing the target queue 130.

The message reception thread 310 may receive a message including the object tracking result transmitted from the object tracking module 210. The message reception thread 310 may arrange at least one object data (bbox-n) included in the object tracking result in the received message based on the depth information and may allocate a priority to the object data with the smallest depth information. In other words, the message reception thread 310 may arrange objects detected in the same image based on distances (depths) between the objects and the action recognition device 100, and may allocate a priority to an object closest to the action recognition device 100.

The message reception thread 310 may determine whether target identification information (target ID) identical to identification information (object ID) of the object data (bbox-n) is present in the target queue 130. When the target ID identical to the object ID is present in the target queue 130, the message reception thread 310 may update target data (target-i) matching the target ID with the object data (bbox-n). The target data (target-i) may be composed of fields respectively storing therein target identification information (e.g. target ID), duplicate or not (used$_i$), the most recently updated timestamp ($t_i^{update}$), template (templates$_i$), action results ($p_{i,h}$), and/or a timestamp based on an action result ($t_h^i$).

When the message reception thread 310 updates the target data (target-i), the message reception thread 310 may update following fields:

1) Duplicate or not: used$_i$=False
2) Recently updated timestamp ($t_i^{update}$): $t_i^{update}$=$t_{cur}$ (where $t_{cur}$ is a current time or a current timestamp)
3) Template (templates$_i$): At least one object image extracted from the image is added as a template based on a coordinate and size information of bbox-n (in this connection, a maximum number (max size) of templates is 16, and thus, when the number of templates exceeds 16, the oldest template may be deleted and then, the object imager may be added)

After updating the target data, the message reception thread 310 may delete the object data (bbox-n) used for the update.

When the target ID matching the object ID is absent in the target queue 130, the message reception thread 310 may determine whether an empty space (vacancy) is present in the target queue 130. When the empty space is present in the target queue 130, the message reception thread 310 may add object data matching the corresponding object ID as new target data to the target queue 130.

The main thread 320 may perform action recognition and target object management. The main thread 320 may identify a front element of the target queue 130 and determine whether to request an action recognition reasoning (action reasoning) request thereof. The main thread 320 may extract (pop) target data (target-i) as the front element from the target queue 130 and determine whether the extracted target data (target-i) satisfies a reasoning condition. When the extracted target data (target-i) satisfies all of following reasoning conditions, the main thread 320 may request the reasoner 120 to perform action reasoning of the target data (target-i).

Reasoning conditions may include:
1) $t_{cur} - t_i^{update} < \tau_{update}$
2) When not used in reasoning (not used$_i$)
3) When a reasoning queue is not full (size($q_{ncs}$)<$\tau_{ncsq}$)
4) When a template size is equal to a preset size (size (templates$_i$)=$\tau_{templates}$) where i denotes identification information (e.g., target ID) of the target data, size ($q_{ncs}$) denotes a free space size of the reasoning queue 121, $\tau_{update}$ denotes a predefined update time (e.g., 1.0 seconds), $\tau_{ncsq}$ denotes a predefined reasoning queue size (e.g., 4), and $\tau_{templates}$ denotes a predefined template size, that is, the number of templates (e.g., 16).

The main thread 320 may change the field of the target data (target-i) extracted from the target queue 130 and then identified to being used (used$_i$=true). The main thread 320 may push the target data (target-i) whose the field has been changed to being used (used$_i$=true) to a last element of the target queue 130. Thus, all target data (target-i) may have equal reasoning opportunity, and duplicate reasoning of the same target data may be avoided.

The reasoner 120 may receive a reasoning request message from the main thread 320. The reasoner 120 may manage the target ID and reasoning ID (reasoning identification information) included in the received reasoning request message as a pair in a separate reasoning queue 121. The reasoning ID may be used as a key by the reasoning engine 330 when the reasoning engine 330 queries a result.

The main thread 320 may inquire whether a request for which the reasoning has been completed is present to the reasoner 120. The reasoner 120 may query whether the reasoning has been completed to the reasoning engine 330, using the reasoning ID.

When the request for which the reasoning has been completed is present, the main thread 320 may receive a pair of the action recognition result and the target ID. The main thread 320 may update the action result of the corresponding target data (target-i) using the target ID of the received reasoning result. The main thread 320 may activate the action result, and delete target data (target-i) that has not been updated for a predetermined time duration from the target queue 130.

The main thread 320 may query whether the reasoning result related to the request for which the reasoning has been completed is present to the reasoning engine 330. Only when the reasoning result related to the request for which the reasoning has been completed is present, the main thread 320 may receive the reasoning result from the reasoning engine 330.

When the reasoning result related to the request for which the reasoning has been completed is absent, the main thread 320 may proceed to a target management step. In this way, the main thread 320 does not wait until receiving the result related to the reasoning request. Thus, the reasoning may be viewed as asynchronous reasoning.

Figure 4:
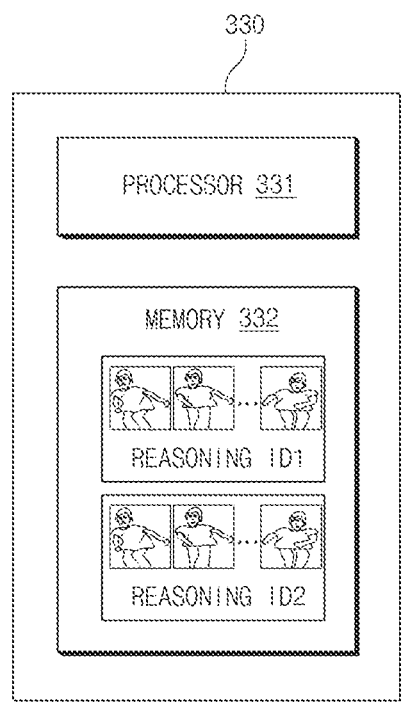
FIG. 4 is a diagram showing a configuration of a reasoning engine according to embodiments of the present disclosure.
Figure 5:
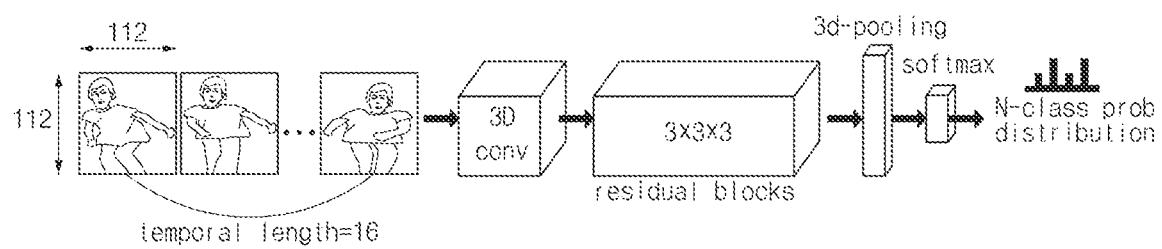
FIG. 5 is a diagram showing an action recognition network structure mounted on the reasoning engine shown in FIG. 4.

FIG. 4 is a diagram showing a configuration of a reasoning engine according to embodiments of the present disclosure, and FIG. 5 is a diagram showing an action recognition network structure mounted in the reasoning engine shown in FIG. 4.

The reasoning engine 330 may have a pre-developed neural network. The reasoning engine 330 may include a processor 331 and a memory 332. That is, the reasoning engine 330 has a separate memory 332 therein. Thus, even though computing on a single reasoning request is not completed, the reasoning engine 330 may pre-load input data to be reasoned within an allowable capacity, thereby minimizing a delay time.

The reasoning engine 330 may be equipped with an action recognition network using a 3D convolutional neural network (CNN). The reasoning engine 330 may improve action recognition performance using a predetermined number of temporal information. The reasoning engine 330 may output a probability distribution related to N classes as a result value.

Figure 6:
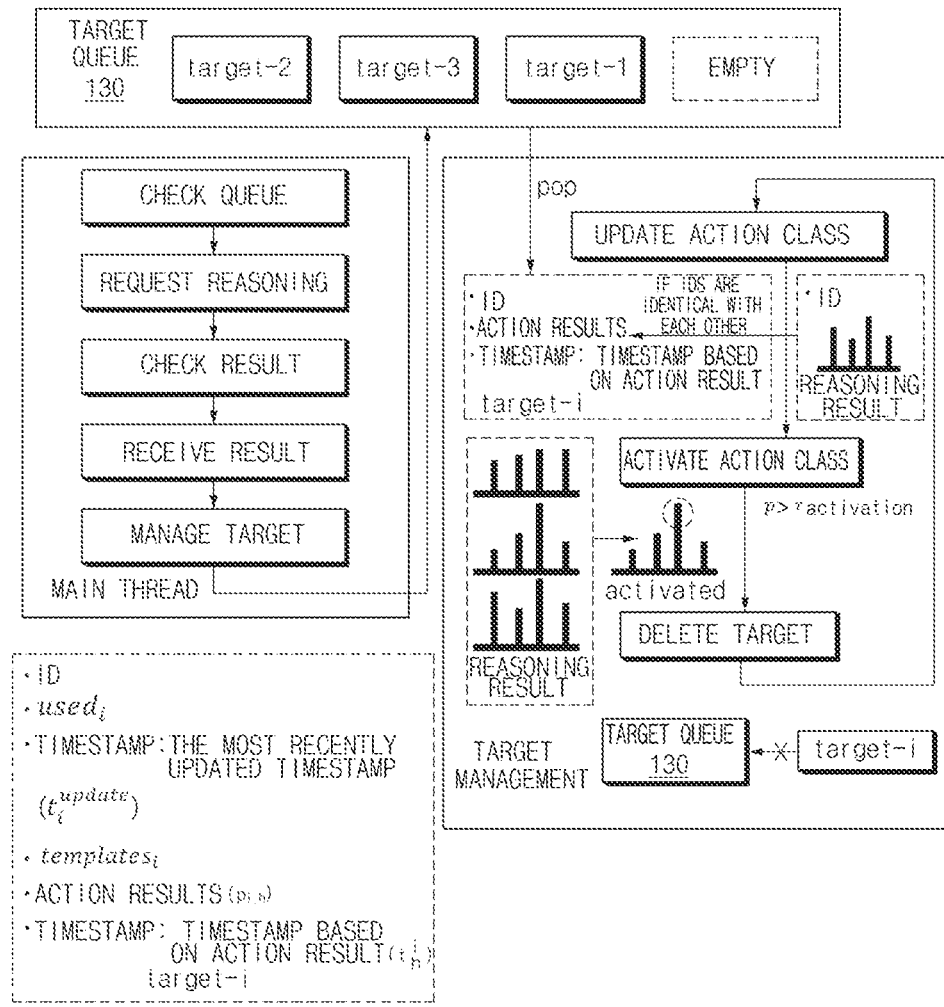
FIG. 6 is a diagram for illustrating a target management method according to embodiments of the present disclosure.

FIG. 6 is a diagram for illustrating a target management method according to embodiments of the present disclosure.

The main thread 320 may perform a target management process on all elements of the target queue 130. The main thread 320 may extract target data (target-i) as a front element from the target queue 130, and perform a target management process on the extracted target data (target-i).

When a target ID of the extracted target data (target-i) matches a target ID of the reasoning result, the main thread 320 may add a current reasoning result to action results ($p_{i,h}$) of the target data (target-i) to update the action result. Further, the main thread 320 may add a current time to a timestamp ($t_h^i$) related to each action result of the corresponding target data (target-i). In other words, the main thread 320 may update a timestamp of the updated action result with the current time.

The main thread 320 may perform action class activation only when the action results ($p_{i,h}$) of the target data (target-i) are updated with the reasoning result. In other words, the main thread 320 may calculate an action recognition result (action recognition information) based on accumulated reasoning results. The main thread 320 may calculate an average probability distribution ($p_i^c$) for each action class using the action results ($p_{i,h}$) of the target data (target-i). Specifically, the main thread 320 may calculate a sum of all action result values of each action class present within a predefined cumulative time ($\tau_{hist}$) (e.g., 1 second or 2 seconds) from the current time ($t_{cur}$), and may divide the sum by the number ($N_{val}$) of action results accumulated in each action class to obtain the average probability distribution ($p_i^c$) for each action class. The average probability distribution ($p_i^c$) for each action class and the number ($N_{val}$) of accumulated action results may be expressed as following Equation 1 and Equation 2:

$$p_i^c = \frac{1}{N_{val}} \sum_{h=1}^{N_{val}} p_{i,h}^c, \text{ subject to } p_{i,h}^c \in [0, 1] \cap \sum_{c=1}^{N_c} p_{i,h}^c == 1 \quad \text{Equation 1}$$

$$N_{val} = \max\{h \mid t_{cur} - t_h^i < \tau_{hist} \cap t_h^i < t_{h-1}^i\} \quad \text{Equation 2}$$

where i, c and h denote a target ID, a class index (e.g., waving a hand: 0, sitting: 1), and a history index, respectively. That is, in $p_{i,h}^c$ denotes a class index of a h-th stored action result. $N_c$ denotes the number of action classes.

The main thread 320 may determine whether to activate the action class based on activation conditions using the average probability distribution ($p_i^c$) for each action class. The main thread 320 may activate an action class that satisfies at least one of the activation conditions.

Activation Condition

1) When the highest average probability distribution ($p_i^{cmax}$) for each action class exceeds a predefined class activation threshold value ($\tau_{max}$)($p_i^{cmax} > \tau_{max}$, cmax=argmax$_c$($p_i^c$))

2) When a difference between a first highest average probability distribution ($p_i^{max}$) for each action class and a second highest average probability distribution ($p_i^{cmax2}$) for each action class exceeds a predefined threshold value ($\tau$gap)($p_i^{cmax} - p_i^{cmax2} > \tau_{gap}$, cmax2=argmax$_c$($p_i^c \cap c \neq$cmax))

Each of $\tau_{max}$ and $\tau_{hist}$ may vary based on action classes.

The main thread 320 may output the activated action class as an action recognition result. The action recognition result may be transferred to the controller of the electronic device and used for device control.

The main thread 320 may perform the target management process of the extracted target data (target-i) and then determine whether the target data (target-i) satisfies a delete condition.

Delete Condition

When a time difference between the current time ($\tau_{cur}$) and the most recently updated timestamp ($t_i^{update}$) exceeds two times of a predefined update time ($\tau_{update}$) ($\tau_{cur} - t_i^{update} > 2*\tau_{update}$)

When the target data (target-i) satisfies the delete condition, the main thread 320 may not push the target data (target-i) back to the target queue 130 and thus may delete the target data (target-i). When the target data (target-i) does not satisfy the delete condition, the main thread 320 may push the target data (target-i) back to a last element of the target queue 130.

Figure 7:
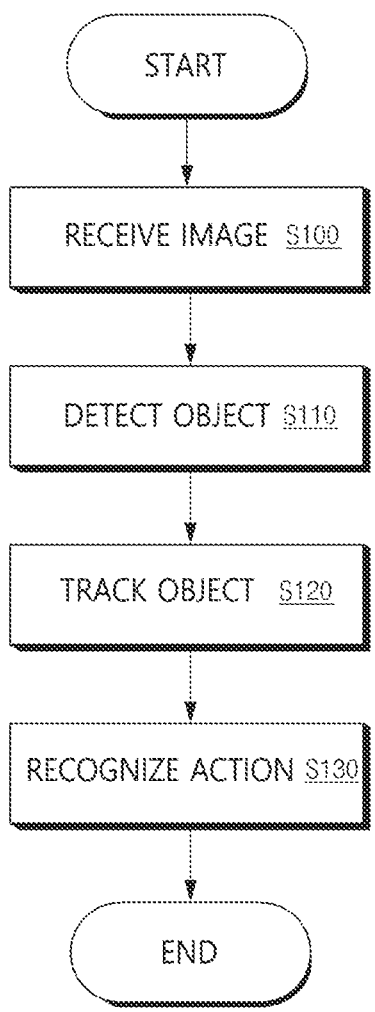
FIG. 7 is a flowchart illustrating an action recognition method according to embodiments of the present disclosure.

FIG. 7 is a flowchart illustrating an action recognition method according to embodiments of the present disclosure.

The computing device 140 of the action recognition device 100 may receive an image from the camera 110 at S100. The camera 110 may capture a surrounding around the action recognition device 100 and transmit a captured image to the computing device 140.

The computing device 140 may detect an object in the image at S110. The computing device 140 may detect a predefined specific object (e.g., a person) in an image.

The computing device 140 may track motion of the detected object at S120. The computing device 140 may generate an object tracking result. The object tracking result may include the image and object information in the image. The object information may include data (object data) of at least one object, for example, identification information of the bbox of the object, center coordinate information of the object, size information and/or depth information of the object, and the like.

The computing device 140 may recognize an action of the target based on the object tracking result at S130. The computing device 140 may update the target based on the object tracking result and perform asynchronous action recognition on the updated target. The computing device 140 may output the action recognition result of the target to the controller of the electronic device. The controller of the electronic device may perform device control using the action recognition result.

Figure 8:
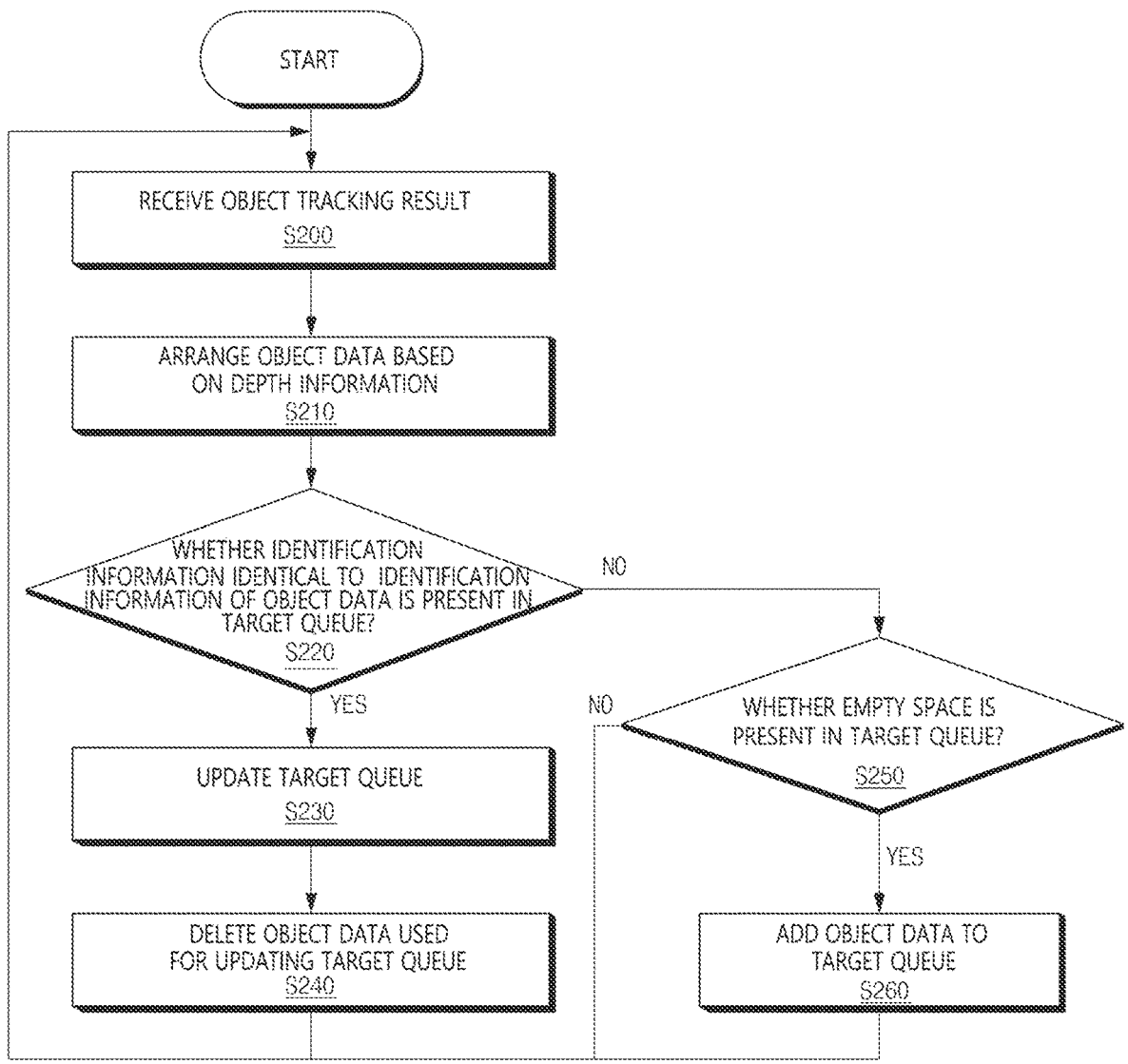
FIG. 8 is a flowchart illustrating an action recognition target update process according to embodiments of the present disclosure.

FIG. 8 is a flowchart illustrating an action recognition target update process according to embodiments of the present disclosure. The action recognition target update may be performed by the message reception thread 310, and the message reception thread 310 may be executed by the computing device 140.

The message reception thread 310 may receive the object tracking result from the object tracking module 210 at S200. The message reception thread 310 may receive an object tracking result message including an image and at least one object data.

The message reception thread 310 may arrange object data included in the object tracking result based on depth information at S210. In other words, the message reception thread 310 may arrange the objects detected in the image in an order in which the objects are closer to the action recognition device 100. The message reception thread 310 may give priority to the object data closest to the action recognition device 100, that is, object data having the smallest depth information.

The message reception thread 310 may determine whether identification information identical to identification information of the object data is present in the target queue 130 at S220. The message reception thread 310 may compare identification information of the object data with identification information of the target data stored in the target queue 130 and thus may detect target data having the same identification information based on the comparing result.

When the same identification information is present in the target queue 130, the message reception thread 310 may update the target queue 130 at S230. The message reception thread 310 may update the target data having the same identification information as the identification information of the object data with the corresponding object data.

The message reception thread 310 may delete the object data used for updating the target queue 130 at S240.

When, at S220, the same identification information as that of the object data is absent in the target queue 130, the message reception thread 310 may determine whether an empty space is present in the target queue 130 at S250. In other words, the message reception thread 310 may determine whether the target queue 130 is not in a full state.

When the empty space is present in the target queue 130, the message reception thread 310 may add the object data as target data to the empty space at S260.

Figure 9:
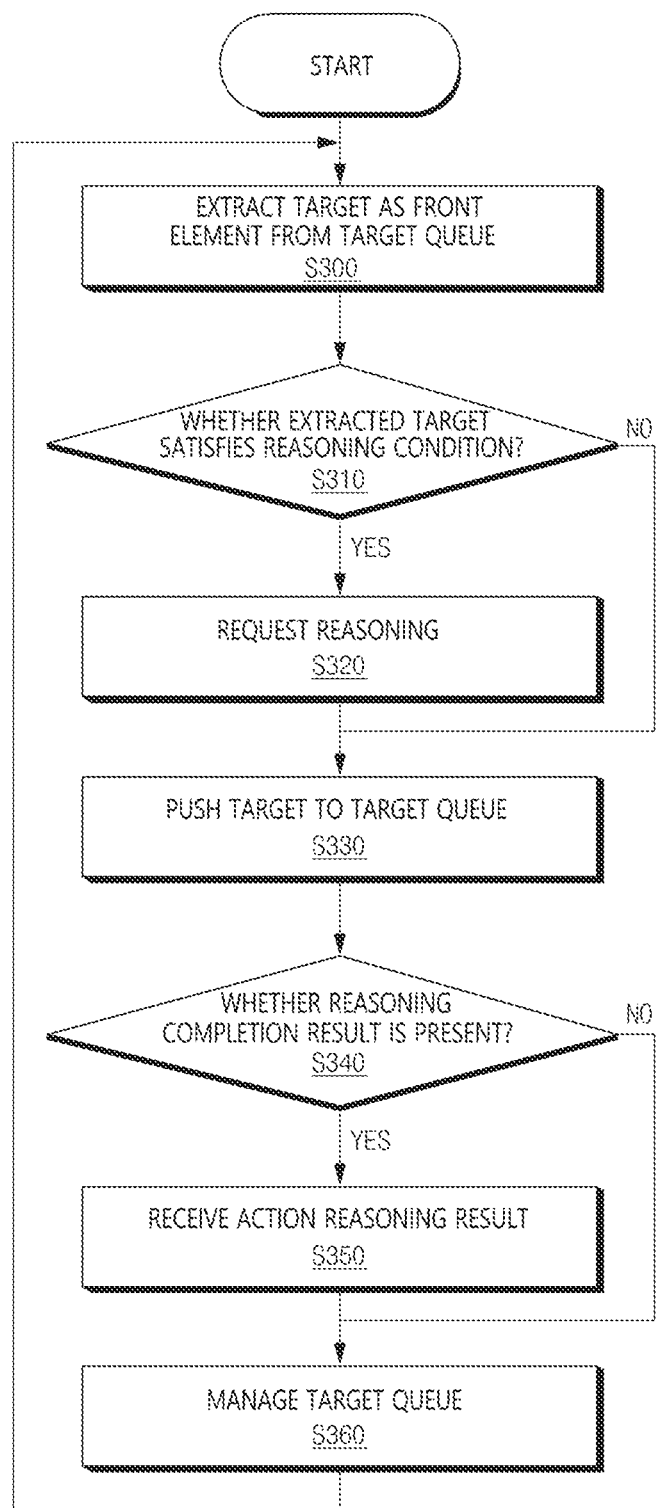
FIG. 9 is a flowchart illustrating an asynchronous action recognition process according to embodiments of the present disclosure.

FIG. 9 is a flowchart illustrating an asynchronous action recognition process according to embodiments of the present disclosure. The asynchronous action recognition may be performed by the main thread 320, and the main thread 320 may be executed by the computing device 140.

The main thread 320 may extract a target as a front element from the target queue 130 at S300. The main thread 320 may extract target data located in a front position of the target queue 130. The main thread 320 may extract the target data from the target queue 130 when the reasoning queue 121 of the reasoner 120 is not in a full state.

The main thread 320 may determine whether the extracted target satisfies the reasoning condition at S310. The main thread 320 may determine whether the extracted target data satisfies the reasoning condition. The reasoning condition may be defined as a case in which the time difference between the current time and the most recently updated time of the target data is smaller than the predefined update time, the target data is not used for reasoning, the number of templates in the target data matches the predefined number of templates, and the reasoning queue 121 of the reasoner 120 is not in a full state.

When the extracted target satisfies the reasoning condition, the main thread 320 may request the reasoner 120 to perform the action reasoning on the target at S320. The main thread 320 may transmit target data satisfying the reasoning condition to the reasoning engine 330 of the reasoner 120. In this connection, the main thread 320 may change use or not information (used$_i$) of the corresponding target data to 'used'. The reasoner 120 may allocate the reasoning ID to the target ID as identification information of the target data on which the reasoning request is made in order to identify the received request. The reasoner 120 may manage the reasoning ID and the target ID as a pair in a separate reasoning queue 121.

The main thread 320 may push the target on which the reasoning is requested back to the target queue 130 at S330. The main thread 320 may push the target data on which the reasoning is requested to a last element of the target queue 130.

The main thread 320 may determine whether a reasoning completion result is present at S340. The main thread 320 may transmit a message inquiring whether a request for which action reasoning has been completed is present to the reasoner 120. The reasoner 120 may determine whether a request for which action reasoning has been completed is present and then may transmit the determination result (e.g., 'Yes' or 'No') to the main thread 320. In this connection, the reasoner 120 may transmit, together with the identification result, a target ID matching the reasoning ID corresponding to the request for which action reasoning has been completed.

When the reasoning completion result is present, the main thread 320 may receive an action reasoning result related to an action on which the reasoning has been completed from the reasoner 120 at S350. The main thread 320 may request the reasoner 120 to provide the action reasoning result and then may receive the same therefrom.

At S340, when the reasoning completion result is absent, the main thread 320 may perform target queue management without waiting for receiving the action reasoning result at S360. The main thread 320 may manage target data stored in the target queue 130 when there is no request for which action reasoning has been completed.

Figure 10:
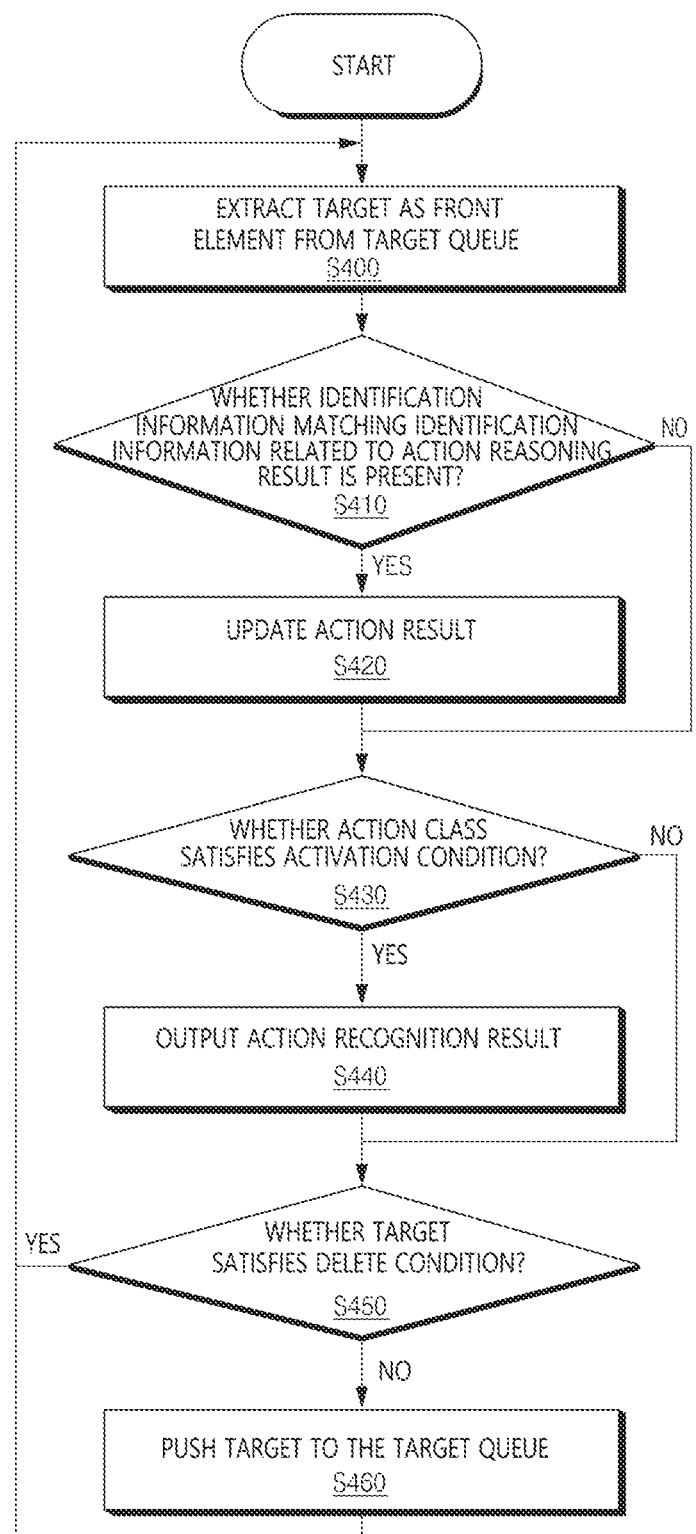
FIG. 10 is a flowchart illustrating a target management process according to embodiments of the present disclosure.

FIG. 10 is a flowchart illustrating a target management process according to embodiments of the present disclosure. The target management may be performed by the main thread 320, and the main thread 320 may be executed by the computing device 140. In this embodiment, descriptions will be made on assumption that the main thread 320 has the action reasoning result received from the reasoner 120.

The main thread 320 may extract a target as a front element from the target queue 130 at S400. In other words, the main thread 320 may extract target data located in a front position of the target queue 130.

The main thread 320 may determine whether identification information matching the identification information related to the action reasoning result is present in the extracted target (target data) at S410. The main thread 320 may determine whether identification information (target ID) related to the action reasoning result matches identification information of the extracted target data.

The main thread 320 may update the action result of the target when the identification information of the extracted target and the identification information related to the action reasoning result match each other at S420. The main thread 320 may update the action results of the extracted target data with an action reasoning result.

The main thread 320 may determine whether an action class satisfies the activation condition, based on the action result of the target at S430. The main thread 320 may calculate an average probability distribution for each action class based on action results of the updated target. The main thread 320 may determine whether the highest average probability distribution ($p_i^{max}$) for each action class exceeds the predefined class activation threshold value ($\tau_{max}$) or whether a difference between the first highest average probability distribution ($p_i^{cmax}$) for each action class and the second highest average probability distribution ($p_i^{cmax2}$) for each action class exceeds the predefined threshold value ($\tau_{gap}$).

When the action class satisfies the activation condition, the main thread 320 may output the action class as an action recognition result at S440. The main thread 320 may activate the action class having the highest average probability distribution, and transmit the activated action class as an action recognition result (action recognition information) to the controller of the electronic device.

The main thread 320 may determine whether the target satisfies the delete condition at S450. When the target does not satisfy the activation condition in S420, the main thread 320 may determine whether the target satisfies the delete condition. The main thread 320 may determine whether the update of the target data has been made while two times of a predefined update time duration has elapsed.

When the target does not satisfy the delete condition, the main thread 320 may push the target back to the target queue 130 at S460.

When at S450, the target satisfies the delete condition, the main thread 320 may delete the target without pushing the target to the target queue 130. When the target data has not been updated for two times of the predefined update time duration (or a predetermined threshold time duration), the main thread 320 may not push the target data to a last element of the target queue 130 but may delete the target data.

Figure 11:
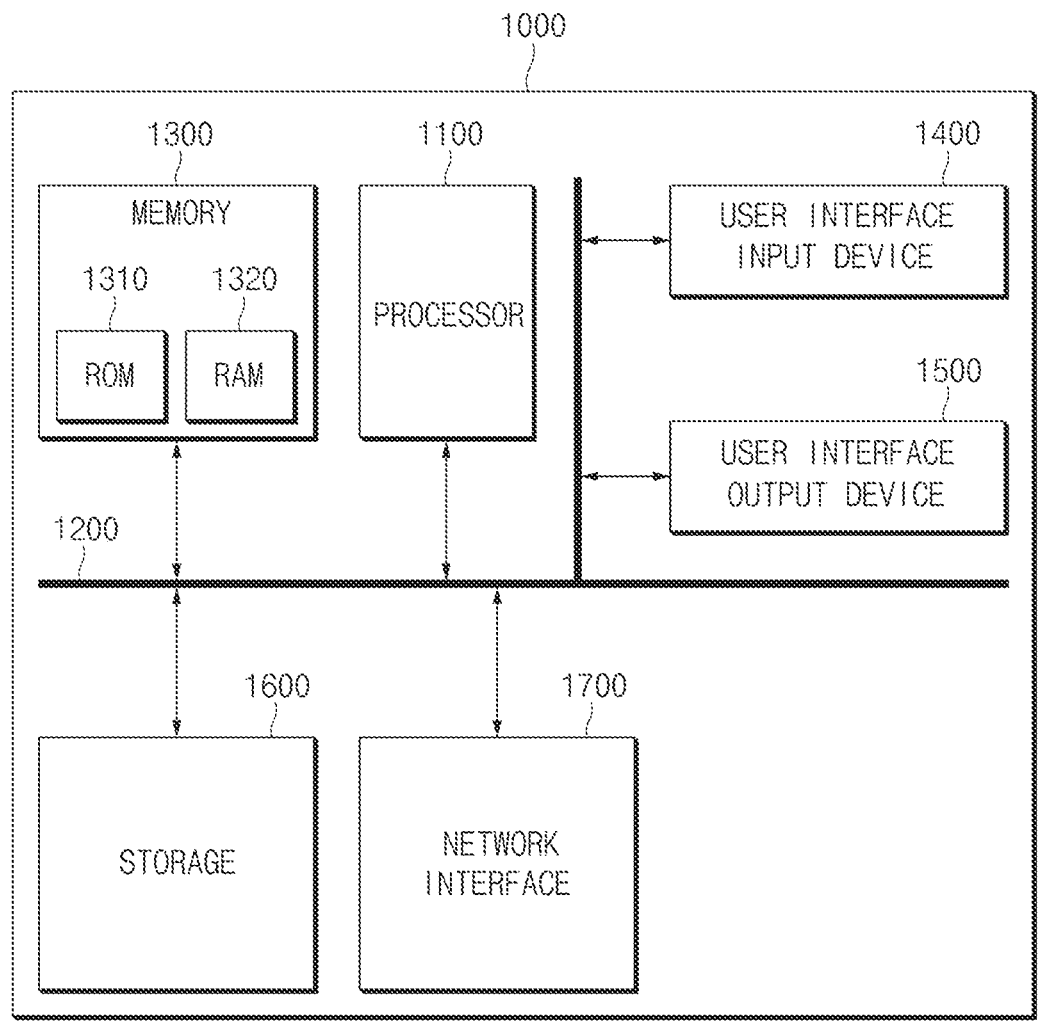
FIG. 11 is a block diagram showing a computing system executing an action recognition method according to embodiments of the present disclosure.

FIG. 11 is a block diagram showing a computing system implementing the action recognition method according to embodiments of the present disclosure.

Referring to FIG. 11, the computing system 1000 includes at least one processor 1100, a memory 1300, a user interface input device 1400, a user interface output device 1500, storage 1600, and a network interface 1700 which are connected to each other through a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

According to the present disclosure, the asynchronous action recognition of multiple objects may be performed using the separate edge device, such that a constant processing speed and performance of the action recognition device may be maintained regardless of change in the number of action recognition targets.

Further, according to the present disclosure, the action recognition targets may be managed using the queue, such that the multiple objects may be subjected to equal reasoning opportunities and thus duplicate reasoning may be avoided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An action recognition device comprising:
   a camera configured to capture an image;
   a target queue configured to store data about at least one target;
   a reasoner configured to perform action reasoning; and
   a computing device electrically connected to the camera, the target queue and the reasoner;
   wherein the computing device is configured to:
   update the target queue based on an object tracking result on the image;
   extract a target from the target queue;
   request the reasoner to perform action reasoning on the extracted target; and
   output an action recognition result based on an action reasoning result provided from the reasoner;
   wherein the computing device is further configured to:
   arrange objects included in the object tracking result based on depth information of the objects;
   search the target queue for a target having the same identification information as identification information of each of the objects in the arrangement order; and
   update data about the searched target using data about each of the objects.

2. The action recognition device of claim 1, wherein the reasoner is an edge device including a processor and a memory.

3. The action recognition device of claim 1, wherein the computing device is further configured to:
   when the target with the same identification information as the identification information of each of the objects is not found in the target queue, determine whether an empty space is present in the target queue; and
   when the empty space is present in the target queue, add the data about each of the objects to the target queue.

4. The action recognition device of claim 1, wherein the computing device is further configured to:
   when the extracted target satisfies a reasoning condition, request the reasoner to perform action reasoning of the extracted target;
   push the extracted target to the target queue;
   determine whether a reasoning completion result is present in the reasoner; and
   when the reasoning completion result is absent in the reasoner, perform target management without waiting for receiving the reasoning completion result; or
   when the reasoning completion result is present in the reasoner, receive the action reasoning result from the reasoner.

5. The action recognition device of claim 4, wherein the reasoning condition includes a condition that a time difference between a current time and a most recently updated time of the extracted target is smaller than a predefined update time, the extracted target has not been used in reasoning, the number of templates of the extracted target is a predefined number, and the separate queue in the reasoner is not in a full state.

6. The action recognition device of claim 4, wherein the computing device is further configured to:
when identification information of the extracted target matches identification information related to the reasoning result, update an action result of a target corresponding to the identification information related to the reasoning result with the reasoning result,
determine whether an action class of the target corresponding to the identification information related to the reasoning result satisfies an activation condition, based on the action result; and
when the action class satisfies the activation condition, output the action class as an action recognition result.

7. The action recognition device of claim 6, wherein the activation condition includes a condition that:
an average probability distribution for the action class is the highest average probability distribution for the action class, and
the highest average probability distribution for the action class exceeds a predefined class activation threshold value or a difference between the highest average probability distribution for the action class and a next highest average probability distribution for the action class exceeds a predefined threshold value.

8. The action recognition device of claim 4, wherein the computing device is further configured to:
determine whether the extracted target satisfies a delete condition; and
when the extracted target satisfies the delete condition, delete the extracted target without pushing the extracted target to the target queue.

9. The action recognition device of claim 8, wherein the delete condition includes a condition that a time difference between the latest update time of the extracted target and a current time exceeds a predetermined threshold time.

10. An action recognition method comprising:
receiving, by a computing device, an image from a camera;
updating, by the computing device, a target queue storing data about at least one target, based on an object tracking result on the image;
reasoning, by the computing device, an action of a target extracted from the target queue using a reasoner; and
outputting, by the computing device, an action recognition result based on an action reasoning result obtained using the reasoner;
wherein the updating of the target queue includes:
arranging, by the computing device, objects included in the object tracking result based on depth information of the objects;
searching, by the computing device, the target queue for a target having the same identification information as identification information of each of the objects in the arrangement order; and
updating, by the computing device, data about the searched target using data about each of the objects.

11. The action recognition method of claim 10, wherein the updating of the target queue includes:
when the target having the same identification information as the identification information of each of the objects is not found in the target queue, determining, by the computing device, whether an empty space is present in the target queue; and
when the empty space is present in the target queue, adding, by the computing device, the data about each of the objects to the target queue.

12. The action recognition method of claim 10, wherein the reasoning of the action of the extracted target includes:
when the extracted target satisfies a reasoning condition, requesting, by the computing device, the reasoner to perform action reasoning of the extracted target;
pushing, by the computing device, the extracted target to the target queue;
determining, by the computing device, whether a reasoning completion result is present in the reasoner; and
when the reasoning completion result is absent in the reasoner, performing, by the computing device, target management without waiting for receiving the result; and
when the reasoning completion result is present in the reasoner, receiving, by the computing device, the action reasoning result from the reasoner.

13. The action recognition method of claim 12, wherein the reasoning condition includes a condition that a time difference between a current time and the most recently updated time of the extracted target is smaller than a predefined update time, the extracted target has not been used in reasoning, the number of templates of the extracted target is a predefined number, and the separate queue in the reasoner is not in a full state.

14. The action recognition method of claim 12, wherein the outputting of the action recognition result includes:
when identification information of the extracted target matches identification information related to the reasoning result, updating, by the computing device, an action result of a target corresponding to the identification information related to the reasoning result with the reasoning result;
determining, by the computing device, whether an action class of the target corresponding to identification information related to the reasoning result satisfies an activation condition, based on the action result; and
when the action class satisfies the activation condition, outputting, by the computing device, the action class as an action recognition result.

15. The action recognition method of claim 14, wherein the activation condition includes a condition that:
an average probability distribution for the action class is the highest average probability distribution for the action class, and
the highest average probability distribution for the action class exceeds a predefined class activation threshold value or a difference between the highest average probability distribution for the action class and a next highest average probability distribution for the action class exceeds a predefined threshold value.

16. The action recognition method of claim 12, wherein the method further comprises:
determining, by the computing device, whether the extracted target satisfies a delete condition; and
when the extracted target satisfies the delete condition, deleting, by the computing device, the extracted target without pushing the extracted target to the target queue.

17. The action recognition method of claim 16, wherein the delete condition includes a condition that a time difference between the latest update time of the extracted target and a current time exceeds a predetermined threshold time.

* * * * *